United States Patent [19]

Koroknay et al.

[11] 4,109,929
[45] Aug. 29, 1978

[54] ANTI-JACK-KNIFING APPARATUS FOR ARTICULATED VEHICLES

[75] Inventors: László Koroknay; István Ratskó, both of Budapest, Hungary

[73] Assignee: Autóipari Kutató Intézet, Budapest, Hungary

[21] Appl. No.: 702,233

[22] Filed: Jul. 2, 1976

[51] Int. Cl.² ............................................. B62D 53/06
[52] U.S. Cl. .................................................... 280/432
[58] Field of Search ..................... 280/432, 433, 446 B; 180/6.64

[56] References Cited

U.S. PATENT DOCUMENTS

| 2,361,935 | 11/1944 | French | 180/6.64 X |
| 2,692,145 | 10/1954 | Hammond et al. | 280/432 |
| 3,250,547 | 5/1966 | Myers | 280/432 |
| 3,917,314 | 11/1975 | Neal | 280/432 |

Primary Examiner—John A. Pekar

[57] ABSTRACT

An articulated vehicle comprises a tractor which has a hydraulic steering gear, and a trailer connected to the tractor by a king-pin. The vehicle further includes anti-jack-knifing apparatus comprising two co-operating brake elements of a brake mechanism, one of which is secured to the tractor and the other to the trailer. The brake mechanism is actuated under the control of a hydraulic control unit responsive to the prevailing pressures in the steering gear, the arrangement being such that a predetermined, steady, anti-jack-knifing braking force is exerted by the braking mechanism when the steering gear is in its center position during rectilinear travel of the vehicle. When the steering is turned, a braking force smaller than the predetermined braking force is exerted.

1 Claim, 4 Drawing Figures

ANTI-JACK-KNIFING APPARATUS FOR ARTICULATED VEHICLES

BACKGROUND OF THE INVENTION

1. Field of the Invention

The invention concerns anti-jack-knifing apparatus for articulated vehicles, primarily for tractor-type vehicles and articulated buses or coaches; hereafter, for simplicity, the driven and towed units of the articulated vehicle will be referred to as "tractor" and "trailer".

2. Discussion of the Prior Art

Anti-jack-knifing devices are known which exert a braking moment around a king-pin that articulates a tractor and a trailer together against the moment of forces tending to cause jack-knifing of the tractor when the tractor or the trailer is braked. Thus for instance Britsh Patent No. 1,256,947 discloses anti-jack-knifing apparatus wherein the braking moment is provided by a disc brake comprising a plurality of plates. The stationary part of the brake is fixed to the base or rubbing plate of the trailer while the rotary part is connected with the king-pin. In deviation from conventional constructions, the king-pin is not fixed rigidly to the rubbing surface of the trailer but instead has a tongue which fits into an appropriately formed part of the coupling on the tractor and thus rotates with the tractor. The plates of the brake are clamped together by a compressed-air operated piston. The air supply is taken from the air-brake system of the trailer via a special valve which operates as a function of the air pressure controlled by the foot brake valve.

In another known construction disclosed in British Patent No. 1,240,554 the anti-jack-knifing brake device is located at the steered front shaft of the trailer and is operated by a brake chamber connected into the brake system of the trailer, and this device operates simultaneously with the wheel brake of the trailer.

In a construction known from British Patent No. 1,295,045 the anti-jack-knifing device includes pistons for a disc-brake which also receive pressure from the wheel brake system of the vehicle, but only when a predetermined pressure in the brake system of the vehicle has been exceeded; this does not completely exclude the possibility of jack-knifing.

The main disadvantage of the above-mentioned known constructions is that the control of the anti-jack-knifing braking system is coupled to the operation of the braking system of the vehicle. These known control systems start from the premise that the lateral supporting force of the tyres decreases and thus the possibility of jack-knifing arises when the wheels at the rear shaft of the tractor lock on braking. However, there is not necessary logical connection between braking, locking and jack-knifing, since there can be factors other than wheel locking to cause a decrease or elimination of the lateral support forces on the tyres mounted on the rear shaft of the tractor. If jack-knifing results from a circumstance other than braking, the known anti-jack-knifing devices are ineffective.

In known devices, the anti-jack-knifing brake construction exerts a braking force the magnitude of which depends on the controlling pressure of the brake valve. In this way the upper limit of the braking effort that can be exerted is limited since the anti-jack-knifing braking construction is unable to render the articulated vehicle rigid when braking occurs during negotiating of a bend.

SUMMARY OF THE PRESENT INVENTION

The present invention seeks to provide an anti-jack-knifing braking system which eliminates, or at least reduces, the disadvantages of known constructions and which makes the generation and actual magnitude of anti-jack-knifing forces independent of the operation of the main vehicle braking system.

Another object of the invention is that the use of the anti-jack-knifing braking system should not make it necessary to alter the customary construction of the king-pin and the coupling.

The present invention seeks to attain the above aims by providing an anti-jack-knifing arrangement linked to the steering gear of the tractor and which constantly exerts the anti-jack-knifing braking effort; this effort is then decreased when the vehicle is turned from a straight path of travel by steering, and the effort is gradually increased when the vehicle steering is turned back.

Accordingly, the present invention provides in one of its aspects anti-jack-knifing apparatus for an articulated vehicle comprising a tractor which has steering gear and a trailer connected by a king-pin, the apparatus including two cooperating brake elements of a brake mechanism, one of which is adapted to be secured to the tractor and the other to the trailer, actuating means for actuating the brake mechanism, and control means responsive to the position of the steering gear so that in use a predetermined steady braking force is exerted by the braking mechanism when the steering gear is in its centre position for rectilinear travel of the vehicle, and when the steering is turned a braking force smaller than the predetermined braking force is exerted.

The novel apparatus not only has the advantageous effect of preventing jack-knifing but in addition it reduces or eliminates undue swaying of the articulated trailer, a result not provided by the known constructions.

The apparatus according to the invention may be used with great advantage with articulated lorries of high axle load and high speed for long distance haulage, for touring vehicles, caravans and articulated buses, which in general operate with hydraulic servo steering gear.

As embodied in the invention, the anti-jack-knifing apparatus has a braking cylinder operated with a pressure medium, which cylinder is controlled by a control unit connected with the high-pressure side, or the working chambers, of the vehicle steering gear.

In a preferred construction of the brake system of the anti-jack-knifing device, in dependence on the pressure medium supply, either a disc brake is used or a pressuremedium operated clutch provided with a lever linkage.

The invention is described in greater detail, by way of example, with reference to two preferred embodiments illustrated in the accompanying, somewhat schematic drawings wherein.

Figure 1:
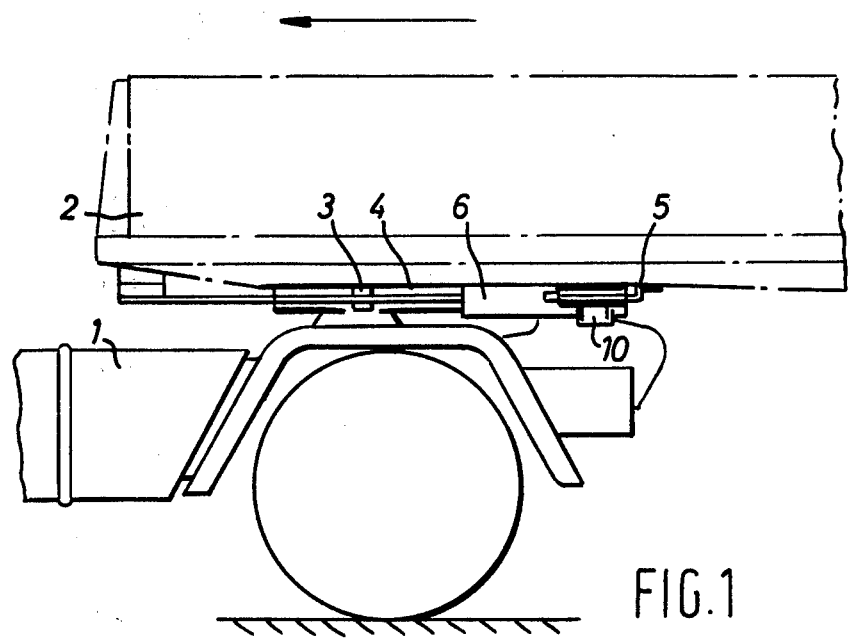
FIG. 1 is a side view of a connection between a tractor, a trailer and illustrating the arrangement of the anti-jack-knifing braking device embodied in the invention.

Referring first to FIG. 1, in which an arrow at the top indicates the direction of normal forward movement of an articulated vehicle, a tractor 1 is connected to a (partly shown) trailer 2 by way of a king-pin 3 engaging with a coupling 4 of the saddle type. The anti-jack-knifing braking construction embodied in the invention is formed as a brake disc 5 in the form of an arcuate brake disc segment and brake callipers 6 fixed (FIG. 2) in a V-shaped groove 7 in the coupling mechanism 4 of the tractor 1.

Figure 3:
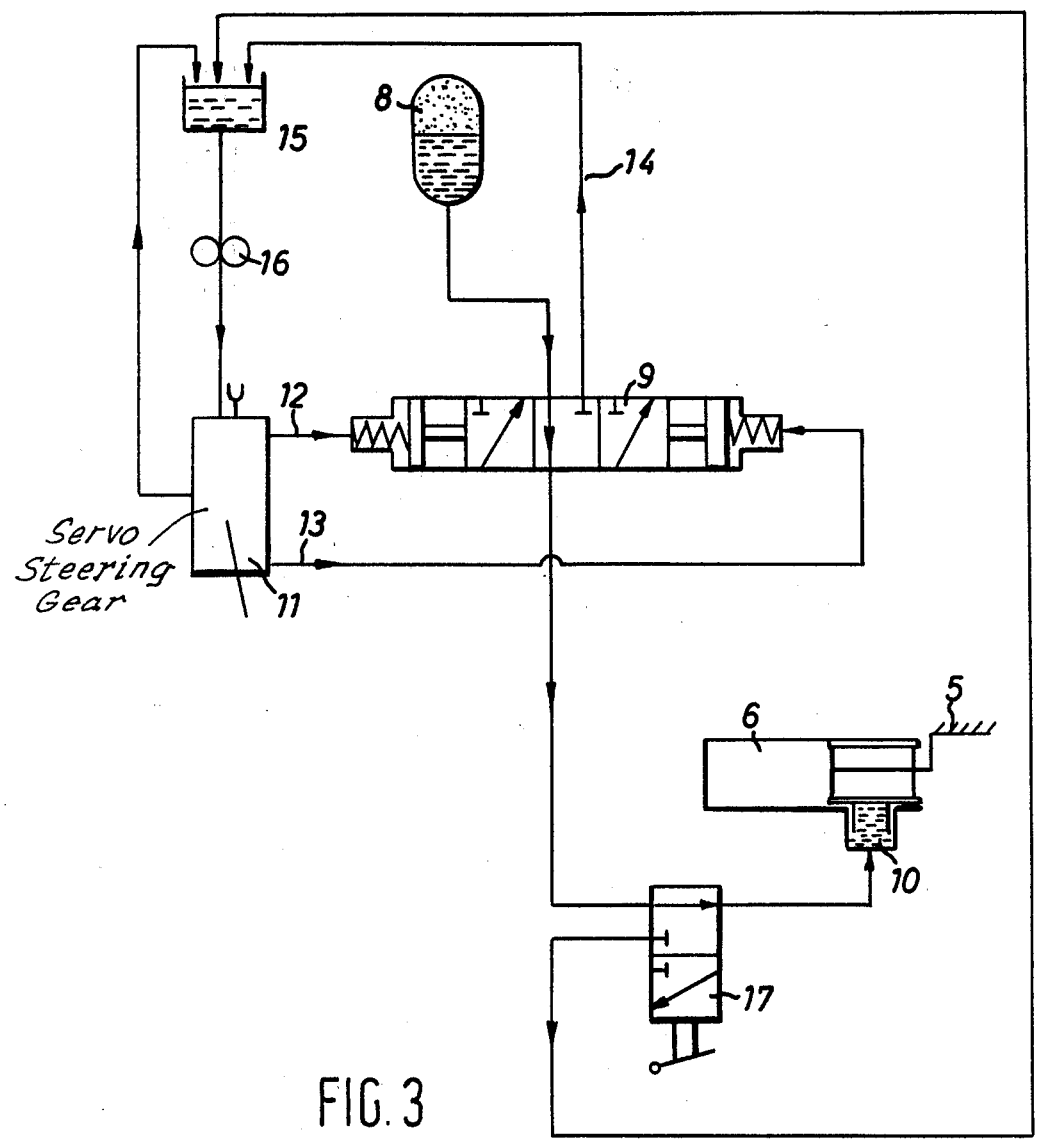
FIG. 3 illustrates a first embodiment with a hydraulic system of the anti-jack-knifing device.

FIG. 3 is a schematic representation of a hydraulic actuation arrangement used in the first exemplary embodiment. A hydraulic accumulator or reservoir 8 is connected via a three-position control valve 9 with a brake cylinder built into the brake callipers 6. For purposes of simplified illustration the setting of accumulator 8 under pressure has been omitted, being a conventional expedient and structure. The control valve 9 is connected with the working spaces of a vehicle servo-steering gear 11 by way of ducts 12 and 13. The control valve 9 is further connected with a return duct 14 leading to a tank 15 associated with the servo-steering gear 11, from which tank a pump 16 conveys pressure fluid to the servo-steering gear 11.

In the duct connecting the control valve 9 with a working cylinder 10 a change-over valve 17 is interposed and is connected with the tank 15 by an appropriate duct. When the trailer 2 is uncoupled from the tractor the valve 17 shuts off the duct between the control valve 9 and the cylinder 10.

The apparatus described so far (FIGS. 1 to 3) operates as follows. When the vehicle travels in a straight line the servo-steering gear 11 is in its centre position and so is the control valve 9, at which time the hydraulic accumulator 8 is connected with the working cylinder 10 of the anti-jack-knifing disc brake as shown, with the valve 17 in its open position. The working cylinder 10 thus exerts a braking force on the effective braking surfaces of the brake disc 5 and thus inhibits angular displacement of the tractor 1 or the trailer 2 about the king-pin 3; in other words, a braking moment is provided to hinder jack-knifing of the vehicle.

When the vehicle is steered to turn, in one of the working spaces or chambers of the servo steering 11 the fluid pressure increases, thereby actuating the control valve 9 to shut off the connection between the hydraulic accumulator 8 and the valve 17. Simultaneously the brake cylinder 10 is connected with the tank 15. Now the tractor 1 and the trailer 2 can turn about the king-pin 3. When the steering of the vehicle is turned back, the above-described sequence of operation takes place in exact reverse and the braking force inhibiting jack-knifing is steadily increased.

Figure 4:
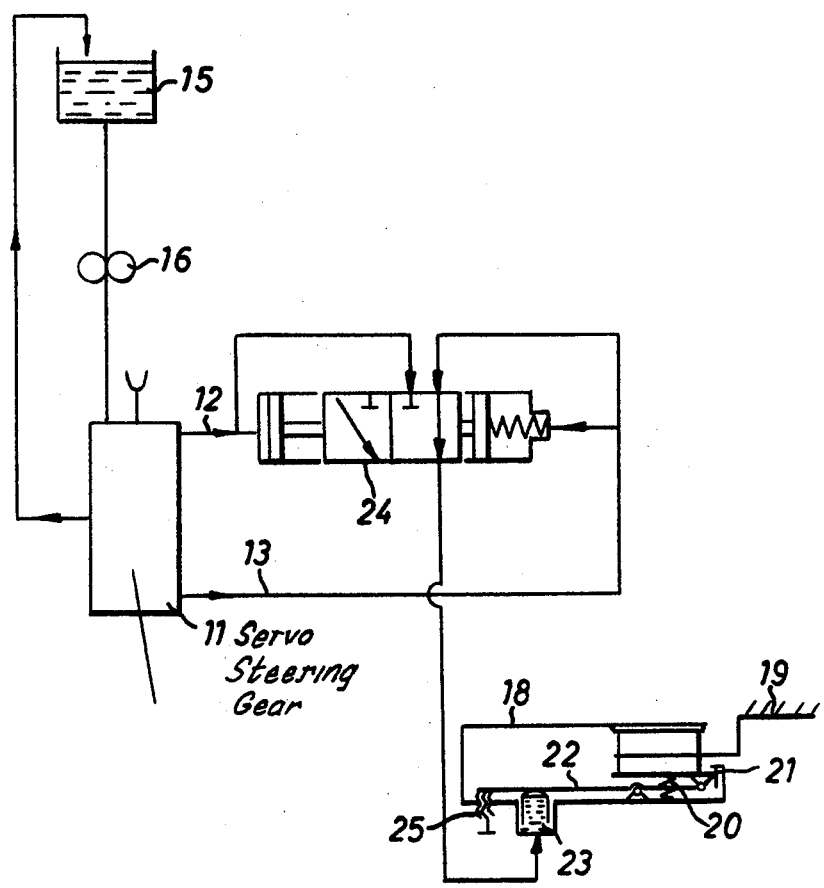
FIG. 4 shows a further preferred embodiment with a hydraulically operated clutch.

The hydraulic lay-out of a further embodiment of the invention is illustrated in FIG. 4 where like parts have been allotted like reference numbers. In this embodiment no hydraulic accumulator is employed but instead the pressure fluid of the servo-steering gear is used to actuate the control linkage of an anti-jack-knife clutch between the tractor and the trailer. A housing 18 of the clutch is secured in the V-shaped notch 7 of the coupling mechanism 4 of the tractor 1 while a brake disc, or disc plate 19 is fixed to the trailer 2 (similar to disc 5 in its function. Compression springs 20 bias the clutch to an engaged position by way of a pressure plate 21 and the clutch exerts a braking moment against any load tending to cause jack-knifing.

As shown in FIG. 4 a two-armed lever linkage 22 is connected to the pressure plate 21, as is a lifting cylinder 23 shown schematically. A screw 25 abutting one arm of lever 22 enables the clutch to be released if the hydraulic system develops a fault or if the trailer 2 and the tractor 1 are uncoupled. The lifting cylinder 23 is connected by way of ducting with a two-position control valve 24 which is in turn connected with the working chambers or spaces of the servo-steering gear 11.

Figure 2:
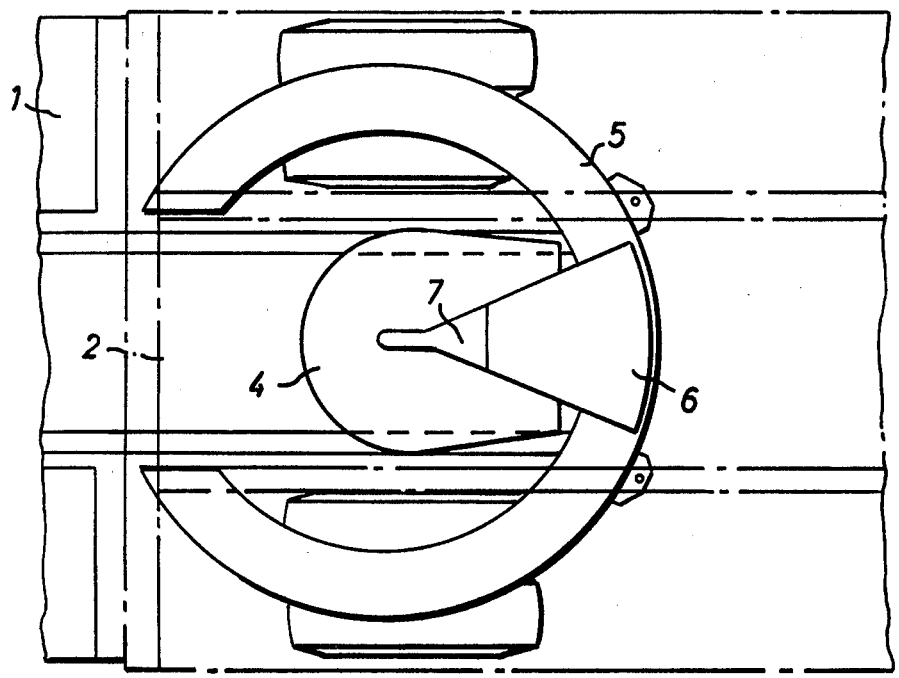
FIG. 2 is a plan view of the construction of FIG. 1.

This apparatus of FIGS. 1, 2 and 4 operates as follows. When the vehicle travels in a straight line the servo-steering gear 11 is in its centre position and under the biasing force of the compression springs 20 the clutch is in its engaged position to exert a braking force against any rotation of the tractor 1 or trailer 2 about the king-pin 3. When the vehicle is steered or turned, the pressure of the pressure fluid increases in one of the working spaces of the hydraulic servo-steering gear 11 and thereby actuates the two-position control valve 24 to free the path of the pressure fluid to the lifting cylinder 23 to disengage the clutch by way of the lever linkage 22.

The tractor 1 and the trailer 2 can now turn about the king-pin 3. When the vehicle is steered in the reverse direction the above-described operation also takes place in the reverse sequence. This means that the braking force preventing jack-knifing gradually increases with the engagement of the clutch. This construction not only inhibits jack-knifing of the tractor and trailer but also during straight, linear travel prevents "snaking" or swaying of the vehicles, because in dependence on the adjustment of the two-position control valve 24, the anti-jack-knifing braking force can be generated in any position of the vehicle.

We claim:

1. An articulated vehicle comprising a tractor (1) which has a hydraulic servo-steering gear (11), and a trailer (2) connected to said tractor by a king-pin (3) through a coupling mechanism (4); the vehicle further comprising an anti-jack-knifing apparatus which includes a clutch having a housing (18) that is connected to said tractor; at least one disc plate (5, 19) that is fixed to said trailer; at least one pressure plate (21) in and connected to said housing for engaging said disc plate; means (20) for pressing said pressure plate toward said disc plate; a linkage (22) between said pressure plate and said housing; a lifting cylinder (23) also in said housing, serving to disengage said disc plate by way of said linkage; and a two-position hydraulic control valve (24) responsive to the position of said steering gear, connected by way of ducting (12, 13; 23/24) to the working spaces of said steering gear and to said cylinder, for normally blocking fluid flow to said cylinder, being movable to a position to introduce the fluid flow to said cylinder by an increase in the pressure in said working spaces.

* * * * *